June 23, 1942.    A. G. KANDOIAN    2,287,621
TWO-COURSE LOCALIZER
Filed Jan. 3, 1940    2 Sheets-Sheet 1
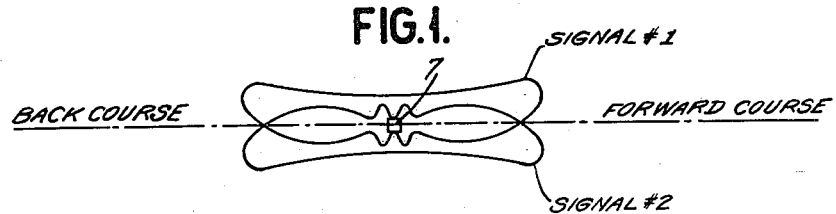
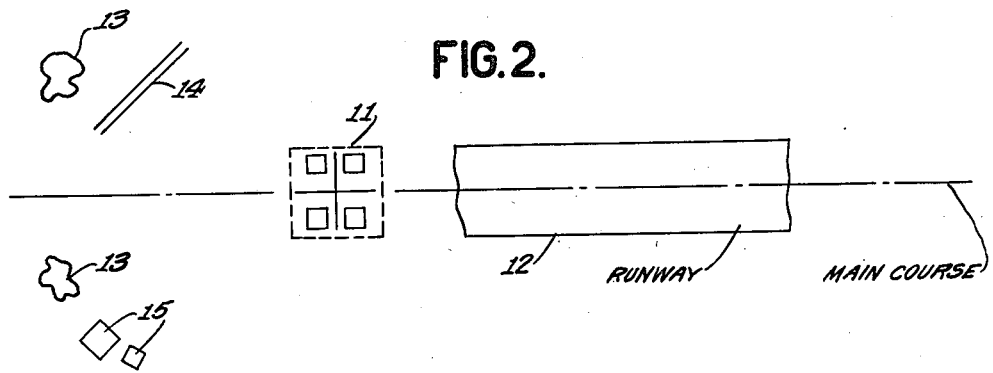
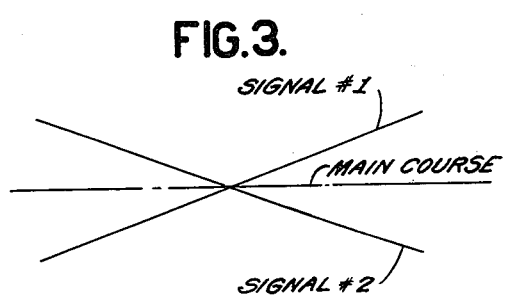
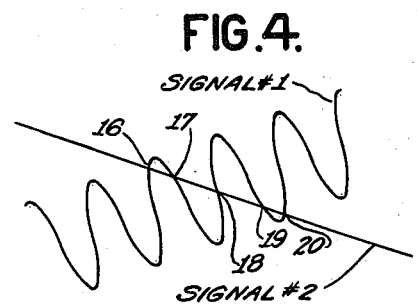
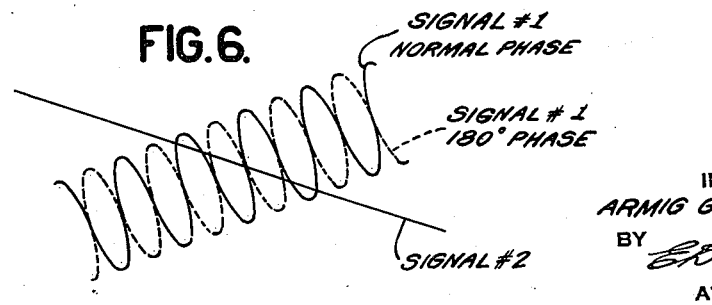
INVENTOR
ARMIG G. KANDOIAN
BY
ATTORNEY June 23, 1942.   A. G. KANDOIAN   2,287,621
TWO-COURSE LOCALIZER
Filed Jan. 3, 1940   2 Sheets-Sheet 2
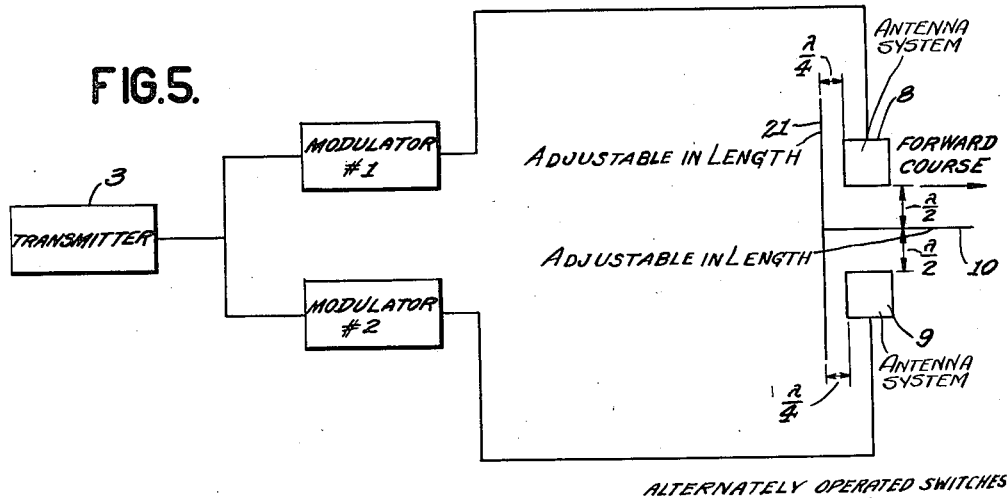
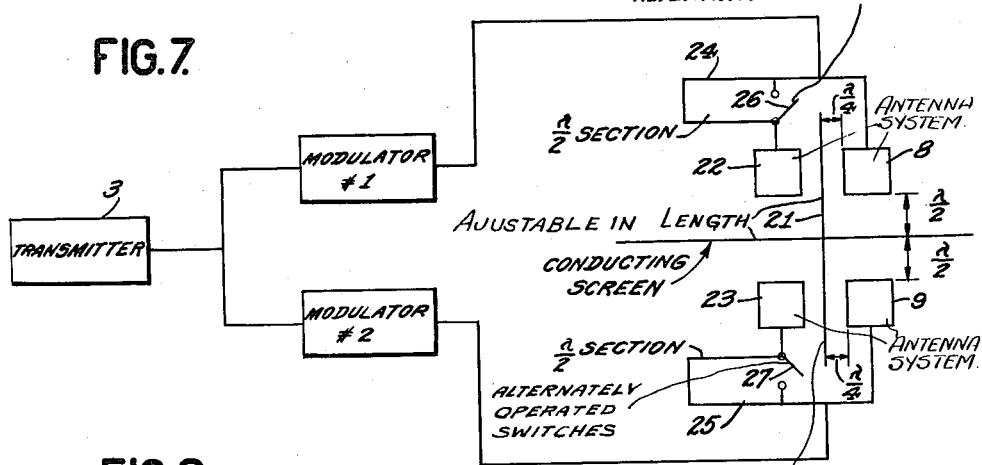
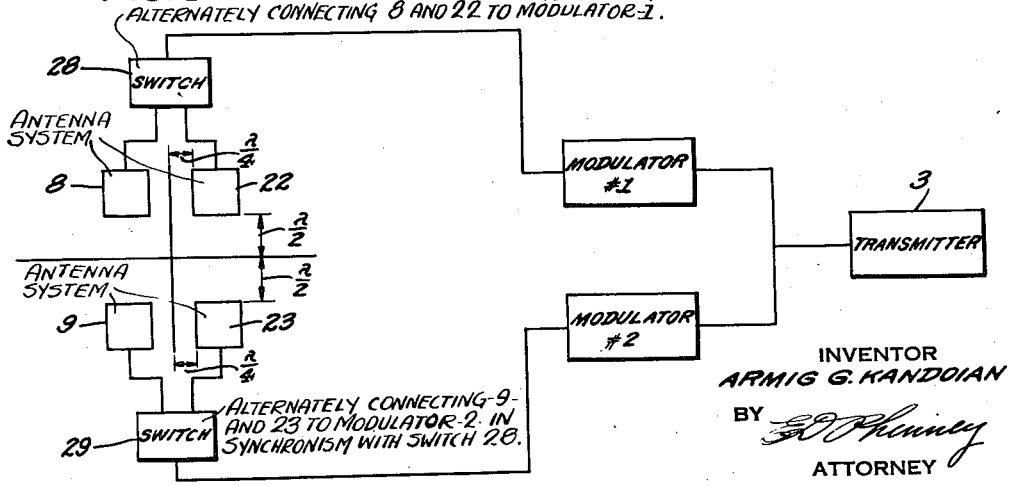
INVENTOR
ARMIG G. KANDOIAN
BY
ATTORNEY Patented June 23, 1942

2,287,621

UNITED STATES PATENT OFFICE 2,287,621

TWO COURSE LOCALIZER

Armig G. Kandoian, New York, N. Y., assignor to International Telephone & Radio Manufacturing Corporation, a corporation of Delaware Application January 3, 1940, Serial No. 312,199

9 Claims. (Cl. 250—11)

My invention relates to antenna systems and more specifically to directive antenna systems associated with aircraft landing beams.

An object of my invention is to provide a method and means of eliminating interference in landing beams due to reflections.

A further object of my invention is to provide an antenna system adapted to the elimination of reflection interference.

Landing beam transmitters with directive antenna arrays generally project two intersecting carrier wave beams that form both a forward course and a back course. The forward course is directed across the landing field and is the guiding course for aircraft landing, whereas the back course is directed out from the field and is used for identification or orientation purposes. To reduce the amount of apparatus required, the beams producing the forward course and the back course have the same antennas and are transmitted at the same frequency. Frequently in the path of the back course there are objects such as telegraph wires, trees and buildings, which reflect part of the back course energy into the path of the forward course. This reflected energy causes distortion of the forward course beams and often produces multiple landing courses. By my invention I eliminate the multiple courses by arranging reflecting shields to eliminate the back course, or by varying the relative energization of the systems, e. g., by alternately energizing the forward course antennas and the back course antennas, or by shifting the phase of the energy transmitted from the back course antennas substantially through 180° at a regular rate. The invention will be more clearly understood by a description associated with the attached drawings, wherein:

Fig. 1 illustrates a known type of radiation field pattern utilized in connection with glide paths and landing courses;

Fig. 2 illustrates a landing runway, and objects external to the field which may produce reflections;

Fig. 3 is an enlargement of the intersection of two signal beams;

Fig. 4 is an enlargement of the intersection of two signal beams, one of the beams being altered by reflected energy;

Fig. 5 is an antenna arrangement of my invention for producing a field pattern similar to the forward course pattern of Fig. 1;

Fig. 6 is an enlargement of the intersection of two signal beams showing the effect of reflections on one of the beams and the effect of shifting the phase of the reflections through 180°;

Fig. 7 shows the antenna arrangement of my invention for shifting the phase of the reflected energy through 180°;

Fig. 8 is another embodiment of my invention for eliminating the distortion due to reflected energy.

Fig. 1 illustrates a known type of radiation pattern frequently used for setting up landing or localizer courses. The signal beam 1 and the signal beam 2, which may be modulated by code or by different frequencies, are produced by the source or sources 7, and these beams intersect and give two courses, a forward course and a back course, the sources being the intersection points of signals of equal strength.

In Fig. 2 a directive antenna array is shown at 11. A forward course is produced by this arrangement along the runway 12 and is designated as the main course. The back radiation from the antenna arrangement is emitted toward the left and may strike objects as the trees 13, telegraph wires 14 or buildings 15. The energy that strikes those objects may be reflected and may in many cases be reflected directly toward the runway along which the forward course beam is directed.

Fig. 3 illustrates the normal intersection of two signal beams along the forward course. Undistorted signal beams of this type intersect at points that lie substantially along a straight line and give a single course in the forward region.

In Fig. 4 the effect of reflected energy on one of the signal beams is shown. Reflection of energy on one side of the course only, distorting the field pattern of one signal beam is assumed for simplicity. The reflected energy will alternately add and subtract from the normal undistorted beam because of the different phasing along the beam casing a distortion in the form of a ripple as indicated at signal No. 1. It may be seen from this diagram that signal beams of equal strength will intersect at 5 different positions 16, 17, 18, 19 and 20, thus giving five different courses which an aircraft may follow in landing. The confusion produced by this multiplicity is evident.

An antenna system for eliminating the interference due to reflections from objects in the back field of radiation of that system is shown in Fig. 5. The antennas 8 and 9 are separated by a conducting screen 10 and backed by a second screen 21. In the preferred embodiment of my invention the antennas are each spaced slightly less, say 5 or 10 per cent, than ½ wave length from the screen or shield 10 and ¼ wave length from the screen 21, and the screens are about ½ wave length long from their junction point, although the spacing of the antennas and the length of the screens is determined by the particular field pattern desired. The screens may, for example, be spaced some multiple of the values given from the antennas. This arrangement produces a field pattern similar to the forward course illustrated in Fig. 1. Screen 10 may be adjusted in length to vary the sharpness of intersection of the beams. Some of the energy radiated will go into the back course region beyond the ends of screen 21. If there are no objects in this region to reflect energy, no interference will be encountered in the forward course. If, however, there are objects in this region, the length of screen 21 should be extended to screen that area from radiation. To keep the forward course symmetrical the screen should be extended equally on both sides.

The antennas used at 8 and 9 may be horizontal loops as shown by the pending application of Andrew Alford, Serial No. 270,173, filed April 26, 1939, vertical dipole or their equivalent, or vertical loops or horizontal dipoles at substantially 45° angles to the screens. The screens should extend above the antennas and be anti-resonant, that is, of a height such that the screen will not act as a parasitic radiator. When vertically polarized antennas are used, the screens may be grounded to decrease the tendency for self-oscillation.

If in some manner the radiation of the back course were shifted 180° in phase according to a pre-determined rate, and the radiation of the forward course were maintained at a steady value, the reflected energy would average out as shown in Fig. 6. In this figure the signal is shown distorted for a portion of the time by the scalloping effect on signal 1, and then the signal 1 is shown distorted in a manner outlined by the dotted line for signal 1, shifted 180° in phase. The effect of this shift in the scalloping is that the distortion averages out and signal beams of a given equal strength intersect at only one point or, in other words, act as though there were no distortion due to reflection.

The arrangement of Fig. 5 has the disadvantage that the back course is removed, and as a further embodiment of my invention, I combine two such antenna systems and vary the relative phase of energization of one or both so that reflection interference averages out. Fig. 7 shows the apparatus of my invention so arranged that the back radiation may be changed in phase at a regular rate while the forward radiation is maintained at a steady value. In this figure antennas 8 and 9 and a conducting screen 10 similar to the antennas and screen of Fig. 6, in combination with the reflector 21, produce a field pattern similar to the forward course of the lobes of Fig. 1. Similarly, antennas 22 and 23, in combination with the conducting screen 10 and the shield 21, produce paths similar to the backward paths of the lobes of Fig. 1. The transmitter 3 and modulators 1 and 2 are continuously operating and feed the antennas. To phase the energy going to the antennas 22 and 23 which radiate along the back course, I provide half wave length sections 24 and 25, which may be inserted in the lines going to the antennas 22 and 23 or shorted out of those lines by means of the switches 26 and 27. These switches are preferably driven by a motor and are synchronized with each other. The motor drives the switches at a rate which is determined by the inertia of the indicating meter located on the landing aircraft. For example, if the inertia is fairly high, antennas 22 and 23 need be phased at a rate of about 20 or 30 times a second. If, however, the inertia of the indicating meter on the aircraft is low, the phasing rate may be increased accordingly. In some cases the phasing disturbances may be desirable for quadrant identification. It is apparent that by this arrangement all distortion due to the reflected energy will be averaged out as in Fig. 5. This is true when the distortion is produced on either or both of the signal beams 1 or 2.

The effect of phase reversal may also be accomplished by retaining the phase of 22 and 23 fixed and reversing the phase of 8 and 9. Another method would be to change the phase of all the antennas with 8 and 9 being phased −90 degrees while 22 and 23 are phased +90 degrees or vice versa. Similar methods of phasing may be devised to accomplish the same result, the chief requirement being that the phase of 22 and 8 and 23 and 9 be 180° different substantially one half of the transmitting time.

An alternative method for eliminating the distortion due to reflection would be to vary the relative time of energization of the antennas producing the radiation for the back course and the front course. An illustration of the arrangement of my apparatus for producing this result is shown in Fig. 8. Transmitter 3 and modulators 1 and 2 are operating continuously. The energy from those sources, however, is alternately put on the antennas 8 and 9 and the antennas 22 and 23 by means of the switches 28 and 29 which are preferably synchronized. These switches may be relays or mechanically driven switches or other switches of a well-known type. It is preferable that the antennas 8 and 9 and the antennas 22 and 23 are energized for equal periods of time. While the antennas 8 and 9 are radiating, the antennas 22 and 23 are not radiating. Hence, there would be no interference or distortion of the forward course radiation due to reflections of the energy of the antennas 22 and 23 during the operation of antennas 8 and 9 because the reflections of energy of the antennas 22 and 23 would cease almost instantaneously with the cessation of radiation of those antennas. No difficulty will result from the alternate energization of those antennas if they are alternately energized at a rate which the indicating meter in aircraft is unable to follow, and again the carrier interruptions may be used for quadrant identification.

The advantage of the arrangement of my invention over a system employing antennas radiating at different frequencies is evident. The antennas 22 and 23 could be made to transmit at one carrier frequency, and the antennas 8 and 9 made to transmit at another carrier frequency, and with this arrangement no interference would be produced in the forward course due to reflections of energy from the back course, but to energize those antennas at two different frequencies would require two transmitters at the least and probably two modulators and transmission lines.

Although my invention has described the antenna systems as employing antennas with screens, it is possible to extend methods to antenna systems employing other types of radiators such as antennas with parabolic reflectors, etc.

While I have described particular embodiments of my invention for purposes of illustration, it will be understood that various adaptations and modifications thereof may be made within the spirit of the invention as set forth in the appended claims.

What I claim is:

1. An arrangement for eliminating reflection interference in multiple antenna systems, comprising a source of radio frequency energy, a first uni-directional antenna system radiating in one direction, and a second uni-directional antenna system radiating in substantially the opposite direction connected to said source, and means for cyclically shifting the phase of the energy supplied to one of said antenna systems with respect to the other system.

2. An arrangement for eliminating reflection interference in multiple antenna systems, comprising a source of radio frequency energy, a first uni-directional antenna system radiating in one direction and a second uni-directional radiating antenna system radiating in substantially the opposite direction connected to said source, and means for cyclically shifting the phase of the energy supplied to both of said antenna systems with respect to each other.

3. An antenna system, comprising a first pair of radiating antennas, a conducting screen between said antennas for regulating the radiation therefrom, a second pair of radiating antennas, a conducting screen between said second antennas for regulating the radiation therefrom, and a conducting screen substantially at right angles to said screens between said first and second pairs of antennas for directing the radiation of each pair.

4. An antenna system according to claim 3 wherein said screens are adjustable.

5. An antenna system, comprising a first pair of radiating antennas, a first conducting screen midway between said antennas for regulating the radiation therefrom, a second pair of radiating antennas, a second conducting screen midway between said second antennas and substantially in line with said first screen for regulating the radiation therefrom, and a third conducting screen substantially at right angles to said screens midway between said first and second pairs of antennas and between said first and second screens for directing the radiation of each pair.

6. An antenna system, comprising a first pair of radiating antennas spaced substantially one wave length apart, a first conducting screen midway between said antennas for regulating the radiation therefrom, a second pair of radiating antennas spaced substantially one wave length apart and substantially ½ wave length from said first pair, a second conducting screen midway between said second antennas and substantially in line with said first screen for regulating the radiation therefrom, and a third conducting screen substantially at right angles to said screens midway between said first and second pairs of antennas and said first and second screens for directing the radiation of each pair.

7. An antenna system, comprising a first pair of radiating antennas spaced less than one wave length apart, a first conducting screen midway between said antennas for regulating the radiation therefrom, a second pair of radiating antennas spaced less than one wave length apart and less than ½ wave length from said first pair, a second conducting screen midway between said second antennas for regulating the radiation therefrom, and a third conducting screen substantially at right angles to said screens midway between said first and second pairs of antennas and said first and second screens for directing the radiation of each pair.

8. An arrangement for eliminating reflection interference in multiple antenna systems, comprising a source of RF energy, a first pair of radiating antennas connected to said source, a conducting screen between said antennas for regulating the radiation therefrom, a second pair of radiating antennas connected to said source, a conducting screen between said second antennas for regulating the radiation therefrom, a conducting screen substantially at right angles to one of said screens between said first and second pairs of antennas for directing the radiation of each pair, and means for shifting the phase of the energy supplied to one of said pairs of antennas relative to the other pair.

9. An arrangement for eliminating reflection interference in multiple antenna systems, comprising a source of RF energy, a first pair of radiating antennas connected to said source, a conducting screen between said antennas for regulating the radiation therefrom, a second pair of radiating antennas connected to said source, a conducting screen between said second antennas for regulating the radiation therefrom, a conducting screen substantially at right angles to one of said screens between said first and second pairs of antennas for directing the radiation of each pair, and means for shifting the phase of the energy supplied to both of said pairs of antennas with respect to each other.

ARMIG G. KANDOIAN.